(12) United States Patent
Wu et al.

(10) Patent No.: US 11,893,156 B2
(45) Date of Patent: Feb. 6, 2024

(54) INFORMATION HANDLING SYSTEM TOUCHPAD WITH MECHANICAL UNIFORM TOUCH RESPONSE

(71) Applicant: Dell Products L.P., Round Rock, TX (US)

(72) Inventors: Chin-Chung Wu, Taipei (TW); Hu Shih Chang, New Taipei (TW); Chih-Ping Chang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 17/509,267

(22) Filed: Oct. 25, 2021

(65) Prior Publication Data

US 2023/0126341 A1 Apr. 27, 2023

(51) Int. Cl.
*G06F 3/041* (2006.01)
*G06F 3/01* (2006.01)

(52) U.S. Cl.
CPC .............. *G06F 3/016* (2013.01); *G06F 3/041* (2013.01)

(58) Field of Classification Search
None
See application file for complete search history.

(56) References Cited

U.S. PATENT DOCUMENTS

| 7,602,384 B2 | 10/2009 | Rosenberg et al. | |
|---|---|---|---|
| 9,069,394 B2 | 6/2015 | Clayton et al. | |
| 9,250,754 B2 | 2/2016 | Tenuta et al. | |
| 9,349,552 B2 | 5/2016 | Huska et al. | |
| 2013/0050099 A1* | 2/2013 | Hirano | G06F 1/169 345/173 |
| 2014/0139442 A1* | 5/2014 | Clayton | G06F 3/041 345/173 |
| 2021/0389806 A1* | 12/2021 | Aurongzeb | H05K 13/00 |

* cited by examiner

*Primary Examiner* — Carl Adams
(74) *Attorney, Agent, or Firm* — ZAGORIN CAVE LLP; Robert W. Holland

(57) ABSTRACT

A portable information handling system touchpad detects button inputs with a downward press at the touch surface that translates to a central button under the touch surface through a frame biased up by a central beam and plural biasing members. Downward presses at the touch surface off center translate towards the center of the frame to provide a central button input that is attributed with right, left and or center button push input values based upon detection of a location at which the downward press touch is sensed by the touch surface.

20 Claims, 3 Drawing Sheets

INFORMATION HANDLING SYSTEM TOUCHPAD WITH MECHANICAL UNIFORM TOUCH RESPONSE

BACKGROUND OF THE INVENTION

Field of the Invention

The present invention relates in general to the field of portable information handling systems, and more particularly to an information handling system touchpad with mechanical uniform touch response.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

In addition to the integrated keyboard, convertible portable information handling systems also typically include a touchpad at the upper surface of the main housing portion. A touchpad operates similarly to a mouse pointing device to provide an end user with cursor movement at a display. The touchpad has a touch region that the end user inputs to with a touch of a finger and dragging movement in the direction of an input. Some touchpads have buttons at the front side that accept press inputs that mimic mouse input buttons, such as a left, middle and right input button. Although separate input buttons at a touchpad simplify end user inputs by mimicking mouse inputs, the separate buttons tend to consume space and detract from a clean system appearance. As a result, touchpads have transitioned away from the use of input buttons to instead have a clicking motion of the touch surface. Traditionally, this approach has attempted to mimic touch buttons with a cantilever design having the touch area press down at the front side with a rotational axis at the rear of the touch area.

Touchpads that accept clicks at the front have a cleaner appearance by removing the input buttons, however, the touch input can be difficult for end users to distinguish as the click motion tends to be minimalist and uneven. Further, including a click feature removes the input buttons by including mechanical click features internally, which can increase the vertical space consumed by the touchpad assembly. One alternative is to remove motion of the touch area by providing a haptic feedback of input button presses. An advantage of this approach is that an end user press to indicate a button input can be performed at any location of the touchpad and affirmed by the haptic feedback. The haptic feedback reduces the height of the touchpad assembly but tends to increase system cost. Whether a mechanical click or haptic feedback is used, the drive towards thinner system housings and reduced palm rest space has presented a challenge in providing a touchpad experience with stable wobble control, consistent and achievable touch input, and replicable input parameters in mass-manufactured information handling systems.

SUMMARY OF THE INVENTION

Therefore, a need has arisen for a system and method which provides a balanced touchpad input button press with a consistent mechanical feedback.

In accordance with the present invention, a system and method are provided which substantially reduce the disadvantages and problems associated with previous methods and systems for inputting button presses at a touchpad touch surface. A trigger bracket floats a touch surface over a base plate with a beam disposed across a frame. The beam has bends to bias the touch surface upwards and away from a push button and distribute force of a downward push so that a uniform motion and input feedback is provided with push button inputs made across the touch surface.

More specifically, a portable information handling system processes information with a processor and memory disposed in a portable housing. Pointer and push button inputs to the information handling system are performed through a touchpad having a touch surface. The touch surface floats over a base plate with a trigger bracket so that a downward press on the touch surface provides a balanced vertical motion that contacts a push button in a central location independent of the location on the touch surface at which the downward press is made. A single central push button provides reliable and repeatable mechanical feedback of completion of a push button input, which may have different values attributed to it based upon the location of the touch surface at which the downward push is made. The trigger bracket provides a balanced push button input feel with a beam disposed across a frame and having bends on both sides of the push button that generate an upwards bias.

Additional upward bias and distribution of the push button input force across the frame is provided with four biasing members extending parallel the beam from each corner of the frame and having a bend to generate the upward bias.

The present invention provides a number of important technical advantages. One example of an important technical advantage is that a uniform push button feel is provided for a downward press made across a touchpad touch surface. A mechanical input feedback is provided to an end user push at completion of an input with a repeatable feel. The push button feedback is provided without expensive haptic devices by using a reliable mechanical biasing device to enforce a uniform feel. A single input push button detects multiple input values based upon a location at which a press is made and sensed by a touch surface of the touchpad.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system touchpad detects a button push at a touch surface with a uniform mechanical feedback across the touchpad. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
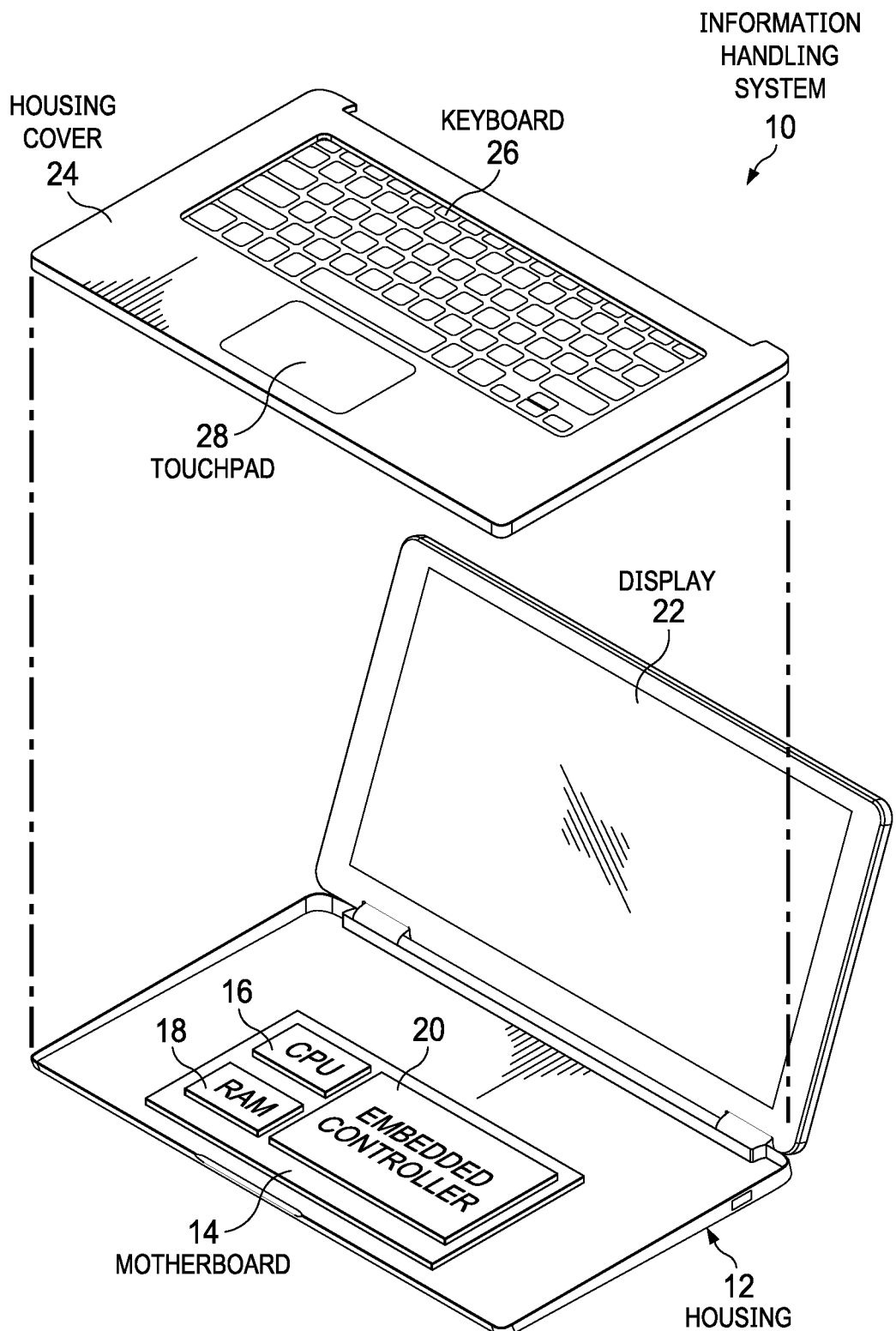
FIG. 1 depicts an information handling system having a touchpad with an input button press having mechanical feedback.

Referring now to FIG. 1, an information handling system 10 is depicted having a touchpad 28 with an input button press having mechanical feedback. In the example embodiment, information handling system 10 has a convertible configuration built in a portable housing 12 having rotationally coupled housing portions. A main portion of portable housing 12 holds processing components that cooperate to process information. For example, a motherboard 14 interfaces a central processing unit (CPU) 16, random access memory (RAM) 18 and embedded controller 20. CPU 16 executes instructions that process information, such as an operating system and applications that run over the operating system. RAM 18 stores the instructions and information to support execution by CPU 16. Embedded controller 20 manages physical operating conditions of the system, such as application of power and maintenance of thermal constraints. In addition, embedded controller 20 manages interaction with input devices, such as a keyboard 26 and touchpad 28 integrated in a housing cover 24 that couples over housing 12. A display 22 interfaces with CPU 16 to present information as visual images. For instance, an application executing on CPU 16 generates visual images for presentation at display 22 that an end user can interact with by inputs at touchpad 28 that change a position of a pointer on display 22.

In the example embodiment, touchpad 28 accepts touch inputs to adjust a cursor or mouse pointer position at display 22, such as a finger sliding across touchpad 28, and also accepts end user presses as inputs, such as left, center and right presses that mimic mouse button inputs. An underlying single beam construction, as described in greater depth below, supports vertical movement of touchpad 28 to activate a button input. A unique floating of touchpad 28 over a single beam support provides a dynamic travel correction that functions so that a press at any location of touchpad 28 translates through the beam to compensate touchpad movement and reduce travel and force for an input, leaving a perception of a uniform and crisp clicking feedback to the end user pressing on touchpad 28. A downward press at any point on the surface of touchpad 28 has a uniform force and pressure to achieve an input with a uniform mechanical feedback at the completion of the input. The location of the press is sensed by the touch surface of touchpad 28 to attribute a value to the press. For instance, a press at the left side indicates a left button input, a press at a center location indication a center button input, and a press at the right side indicates a right button input.

Figure 2:
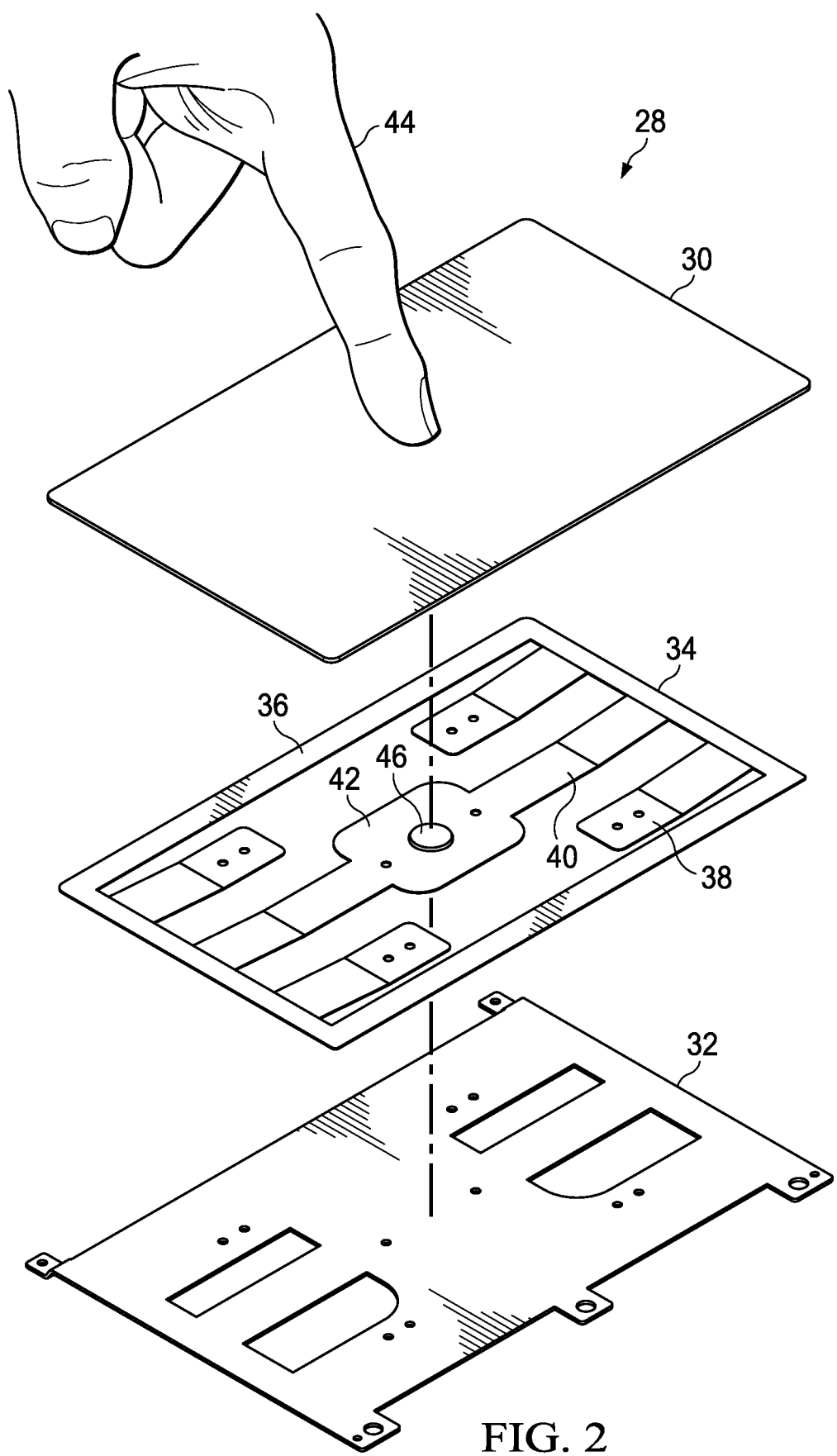
FIG. 2 depicts an exploded perspective view of the touchpad having the input button press with mechanical feedback.

Referring now to FIG. 2, an exploded perspective view depicts the touchpad 28 having the input button 46 press with mechanical feedback. A touch surface 30 is exposed at the upper side of touchpad 28 and includes a touch sensing surface and printed circuit board that detects end user touches, such as to support pointer control. Finger 44 illustrates that touches at touch surface 30 may be directional in nature or also a press downward to perform a button push. A support bracket 32 provides a stiff surface against which presses work. A trigger bracket 34 is disposed between touch surface 30 and support bracket 32 and supports touch surface 30 to float over support bracket 32 so that presses down on touch surface 30 having a vertical movement down towards support bracket 32. Trigger bracket 34 has a frame 36 with a perimeter that aligns with the perimeter of touch surface 30. Frame 36 is held in a floating position above support bracket 32 by a beam 40 that extends across the opening of frame 36 and has a button area 42 with an opening through which a button 46 fits. For instance, beam 40 has a bend at each opposing side of button area 42 that pushes down against support bracket 32 and holds frame 36 in a raised position over support bracket 32. In addition, four biasing members 38 extend from frame 36 at each corner and parallel to beam 40. Each biasing member 38 has a bend that presses against support bracket 32 to bias frame 36 upwards from support bracket 32. A push button 46 at the center of beam 40 provides a push button input when touch surface 30 is pressed downward so that frame 36 moves toward support bracket 32 to contact push button 46 against the bottom side of touch surface 30. In one embodiment, a touch button input is detected with a sensor in push button 46 when sufficient force is applied down against push button 46 by the bottom surface of touch surface 30. In an alternative embodiment, a touch button input is detected when push button 46 contacts a sensor in the bottom surface of touch surface 30. The type of button input may be determined at the embedded controller, such as based upon sensed inputs communicated from the touch surface or with a controller of the touch surface, such as with firmware instructions stored in non-transitory memory of the embedded controller or touch surface controller. Push button 46 provides a physical feedback of an input completion, such as a button click.

Figure 3:
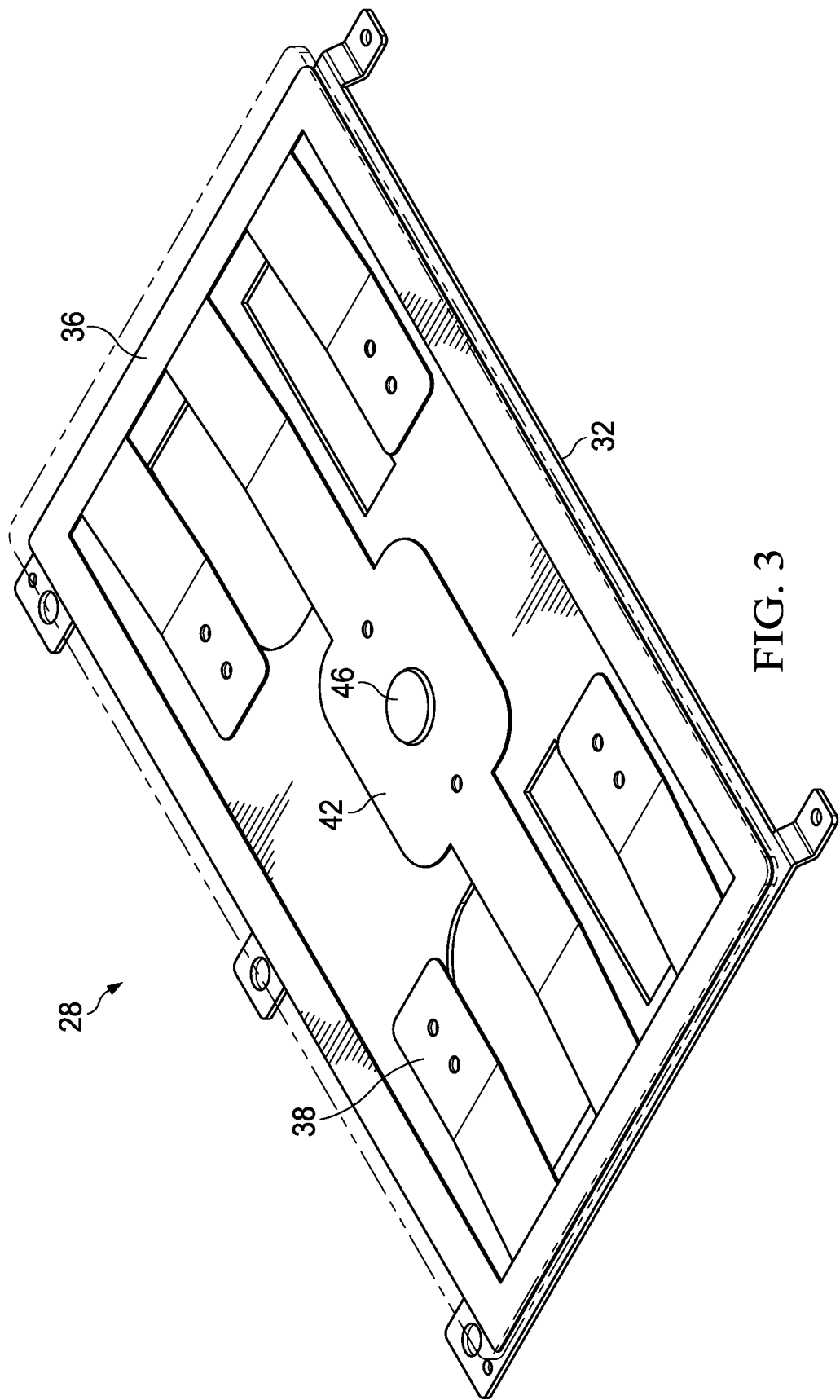
FIG. 3 depicts a transparent perspective view of the touchpad responsive to an end user input.

Referring now to FIG. 3, a transparent perspective view depicts the touchpad 28 responsive to an end user input, such as with a downward press by a finger. In a downward press at the center where button 46 is located, the touch surface (indicated by a dotted line) moves downward to contact against button 46. An end user finger may perform a downward press of similar force and any location of the touch surface to obtain a push button input. A press towards a side of the touch surface translates through frame 36 and with the biasing provided by the bends in beam 40 and biasing members 38 so that a uniform motion of the touch surface is perceived by the end user. As one side of frame 36 presses downward in response to an end user finger push, the opposing side has a balanced downward movement translated through frame 36 to achieve contact at input button 46. To achieve the upward bias from the bends of beam 40 and biasing members 38, trigger bracket 34 may be manufactured from a contiguous piece of metal, such as stainless steel or an elastic material, such as superelastic nickel titanium alloy. The amount of force provided may be adjusted for particular implementations with adjustments in the thickness of the material of trigger bracket 34, the amount of bend formed in the beam and biasing members, and the feel provided by resistance of push button 46 at completion of an input.

Although the present invention has been described in detail, it should be understood that various changes, substitutions and alterations can be made hereto without departing from the spirit and scope of the invention as defined by the appended claims.

What is claimed is:

1. An information handling system comprising:
a portable housing having an upper surface;
a processor disposed in the portable housing and operable to execute instructions to process information;
a memory disposed in the portable housing and operable to store the instructions and information;
an embedded controller interfaced with the processor and operable to manage inputs from input devices for communication to the processor; and
a touchpad disposed at the upper surface, the touchpad having an exposed touch surface that detects touch inputs, a base plate disposed under the touch surface fixed in position relative to the portable housing upper surface and supporting a central button, and a trigger bracket disposed between the touch surface and base plate, the trigger bracket having a frame aligned with a perimeter of the touch surface and a beam extending across the frame and a central location of the touch surface, the beam biasing the touch surface away from the base plate and having an opening at the central location through which the central button is exposed to a bottom surface of the touch surface, the touchpad detecting a button input press based upon contact of the central button against the bottom surface of the touch surface.

2. The information handling system of claim 1 further comprising:
a biasing member extending from the frame parallel the beam proximate each corner of the frame, each biasing member biasing the touch surface away from the base plate;
wherein a downward press of the touch surface at a biasing member translates through the frame to lower the beam relative the central button for contact of the touch surface at the central button.

3. The information handling system of claim 2 wherein the button input press is detected with a sensor of the central button.

4. The information handling system of claim 2 wherein the button input press is detected with a sensor of the touch surface that contacts the central button.

5. The information handling system of claim 2 wherein the embedded controller interfaces with the touchpad to communicate touchpad inputs to the processor.

6. The information handling system of claim 5 wherein the embedded controller reports a first button push input when the central button is contacted by a touch at a first side of the touch surface and a second button push when the central button is contacted by a touch as a second side of the touch surface.

7. The information handling system of claim 6 wherein the embedded controller reports a third button push input when the central button is contacted by a touch at a central location of the touch surface.

8. The information handling system of claim 2 wherein the frame, beam and biasing members comprise a contiguous piece of stainless steel.

9. The information handling system of claim 8 wherein:
the beam biases the touch surface up at a central location with a crease bent in the beam at each of opposing sides of the central location; and
each of the biasing members bias the touch surface up at the frame with a crease bent in each biasing member.

10. A method for detecting button pushes at an information handling system touchpad, the method comprising:
biasing the touchpad touch surface up at an upper surface of the information handling system housing with a frame disposed at a perimeter of the touch surface and a beam extending across the frame and through a central location of the touch surface, the beam having a crease bent at each opposing sides of the central location; and
translating a downward press of the touch surface to contact a bottom side of the touch surface against a central button extending through an opening of the beam as the beam flexes downward in response to the downward press of the touch surface, the contact of the central button generating a button input.

11. The method of claim 10 further comprising:
biasing the touch surface up with a biasing member extending from the frame parallel the beam proximate each corner of the frame; and
translating the downward press of the touch surface with the biasing members through the frame towards contact of the central button with the touch surface bottom side.

12. The method of claim 11 further comprising detecting the central button contact with the touch surface bottom side with a sensor of the central button.

13. The method of claim 11 further comprising detecting the central button contact with the touch surface bottom side with a sensor of the touch surface.

14. The method of claim 11 further comprising:
determining whether the downward press is at a first or second side of the touch surface;
applying a first value to the button input when the downward press is at the first side; and
applying a second value to the button input when the downward press is at the second side.

15. The method of claim 14 further comprising:
determining the downward press is at a central area of the touch surface; and
applying a third value to the button input when the downward press is at the central area.

16. The method of claim 11 wherein the frame, beam and biasing members comprise a contiguous piece of titanium nickel alloy.

17. A touchpad comprising:
a touch surface that detects touch inputs;
a base plate disposed under the touch surface and supporting a central button; and
a trigger bracket disposed between the touch surface and base plate, the trigger bracket having a frame aligned with a perimeter of the touch surface and a beam extending across the frame and a central location of the touch surface, the beam biasing the touch surface away from the base plate and having an opening at the central location through which the central button is exposed to a bottom surface of the touch surface, the touchpad detecting a button input press based upon contact of the central button against the bottom surface of the touch surface.

18. The touchpad of claim 17 further comprising:
four biasing members, one biasing member extending from the frame parallel the beam proximate each corner of the frame, each biasing member biasing the touch surface away from the base plate;
wherein a downward press of the touch surface at a biasing member translates through the frame to lower the beam relative the central button for contact of the touch surface at the central button to detect a button input.

19. The touchpad of claim 18 further comprising:
a controller operable to execute instructions;
a non-transitory memory interfaced with the controller and operable to store instructions;
instructions that when executed on the controller cause a value of the button input to depend upon a location of the touch surface of the downward press.

20. The touchpad of claim 19 wherein the frame, beam and four biasing members comprises a contiguous metal material with bends at each side of a center of the beam and in each of the four biasing members cooperating to bias the touch surface upward.

* * * * *